(12) United States Patent
Wun

(10) Patent No.: US 6,229,294 B1
(45) Date of Patent: May 8, 2001

(54) MAGNETIC NAIL/STUD SENSOR

(76) Inventor: Leon Wun, 78 Loma Vista Dr., Burlingame, CA (US) 94010

( * ) Notice: Subject to any disclaimer, the term of this patent is extended or adjusted under 35 U.S.C. 154(b) by 0 days.

(21) Appl. No.: 09/437,998

(22) Filed: Nov. 10, 1999

Related U.S. Application Data

(60) Provisional application No. 60/108,118, filed on Nov. 12, 1998.

(51) Int. Cl.$^7$ .................................................... G01R 19/00
(52) U.S. Cl. .............................................. 324/67; 324/228
(58) Field of Search ..................... 324/228, 226, 324/67, 96, 323, 326; D10/65, 69

(56) References Cited

U.S. PATENT DOCUMENTS

| | | |
|---|---|---|
| D. 374,595 * | 10/1996 | Welder ...................................... D8/14 |
| 2,723,369 | 11/1955 | Brummett . |
| 2,933,679 * | 4/1960 | Bray .................................. 324/207.2 |
| 3,363,208 * | 1/1968 | Balet ..................................... 335/285 |
| 3,845,384 | 10/1974 | Stoutenberg et al. . |
| 4,099,118 | 7/1978 | Franklin et al. . |
| 4,310,797 | 1/1982 | Butler . |
| 4,634,974 | 1/1987 | Hunter . |
| 4,700,489 | 10/1987 | Vasile . |
| 4,896,131 | 1/1990 | Podlesny et al. . |
| 4,944,096 | 7/1990 | Tolley . |
| 5,148,108 | 9/1992 | Dufour . |
| 5,793,200 * | 8/1998 | Berrill ................................ 324/207.2 |

OTHER PUBLICATIONS

Welder Anton P, Stud Finder, Jan. 27, 1995, PTO S/R #29/034,161, Remark p. 1.*

* cited by examiner

*Primary Examiner*—Christina Oda
*Assistant Examiner*—Subhash Zaveri
(74) *Attorney, Agent, or Firm*—Kolisch, Hartwell, Dickinson, McCormack & Heuser

(57) ABSTRACT

A stud detector for detecting studs behind the surface of a wall, the stud detector having a measuring member with first and second ends and a preselected length that corresponds to a conventionally used stud configuration. A sensor is connected to the second end of the measuring member, the sensor including a magnet for detecting the presence of a stud behind a surface of a wall by detecting the presence of a metal object. The measuring member is adapted to permit identification of a surface portion of a wall behind which a stud might be located by measuring a preselected distance from a reference point.

28 Claims, 2 Drawing Sheets

MAGNETIC NAIL/STUD SENSOR

CROSS-REFERENCE TO RELATED APPLICATION

This application claims priority from U.S. Provisional Patent Application Ser. No. 60/108,118, filed Nov. 12, 1998 of Leon Wun entitled MAGNETIC NAIL/STUD SENSOR, the disclosure of which is incorporated herein by this reference.

BACKGROUND

The present invention relates generally to stud finding devices and methods, and particularly to a device and method for locating studs using a magnet.

In construction, the studs, beams or other structures used to support a wall are concealed behind the surface of the wall once construction of the wall is completed. However, it is often desirable to locate these structures after the wall is finished in order to attach framed pictures, shelves, or other heavy objects to the wall. One method of locating concealed studs is to magnetically sense the nails or other metallic fasteners which are commonly used to secure drywall or wallboard to studs.

Several stud detector designs exist which use permanent magnets to sense nail heads. The known designs typically have a magnet that pivots or otherwise moves within a housing to indicate the presence of a nail. For example, in some designs, a magnet is pivotally mounted within a transparent housing so that a user can visually perceive movement of the magnet when a nail is detected. Moving magnet designs offer an inexpensive alternative to the various electronic stud detectors that are available, however these designs suffer from certain problems and disadvantages.

In certain designs, providing a magnet that pivots complicates the design of the stud detector housing. The interior of the housing must be designed with pivot bosses or other structures adapted to allow the magnet to freely pivot within the housing. The moving parts are subject to wear and damage, and the housing must be designed to prevent dust or other debris from interfering with the motion of the magnet. The housing must accommodate the motion of the magnet and, in the case of most pivoting magnet designs, must allow a person using the stud detector to visually perceive the magnet as it moves. These considerations complicate the design and add to the manufacturing cost of the stud detector.

In addition, use of a moving magnet can adversely affect the performance of a stud detector. For example, stud detectors with pivoting magnets must be moved slowly over the surface of a wall. Fast movements tend to jostle the detector, causing the magnet to pivot and falsely indicate the presence of a nail. Also, quickly passing the magnet over a nail may cause the detector to not detect the nail—the detector magnet must be placed near the nail long enough for the magnetic attraction to move the magnet to a position where it indicates the presence of the nail. A related problem with moving magnet designs is that the magnet is typically spaced from the wall surface when searching for a stud. The farther the magnet is from a nail when searching for a stud, the weaker the magnetic attraction between the nail and magnet. Also, in pivoting designs, when a magnet is pivoted away from a wall surface behind which a nail is located, the magnetic field of the magnet is not optimally oriented for attracting the nail. Attraction between the magnet and nail is much stronger when the magnet is pivoted toward the wall so that the magnetic field is perpendicular to the wall surface.

Finally, known stud detectors provide no way of identifying an area of a wall in which a stud is likely to be found. A person trying to locate a stud with these detectors must randomly guess as to an area on a wall surface in which to begin searching for a stud.

DETAILED DESCRIPTION

Figure 1:
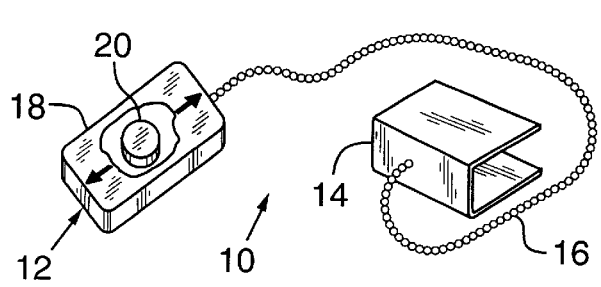
FIG. 1 is an isometric view of a stud detector constructed according to the present invention.
Figure 2:
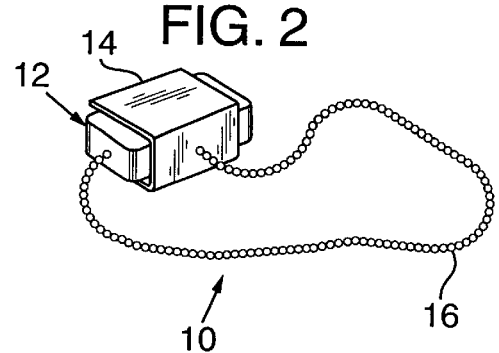
FIG. 2 is an isometric view of the stud detector of FIG. 1, with the stud detector housing stored in the stud detector clip.

FIGS. 1 and 2 depict a stud detector 10 according to the present invention. The principal components of the stud detector are a sensor 12, a clip 14, and a swinging/measuring member, such as chain 16. A first end of chain 16 is connected to the clip, and a second end of the chain is connected to the sensor. Sensor 12 includes a housing 18 and a magnet 20 secured within the housing for detecting studs behind the surface of a wall. Clip 14 is metallic and is sized so that the sensor can be stored within the clip when the stud detector is not in use, as shown in FIG. 2.

Figure 3:
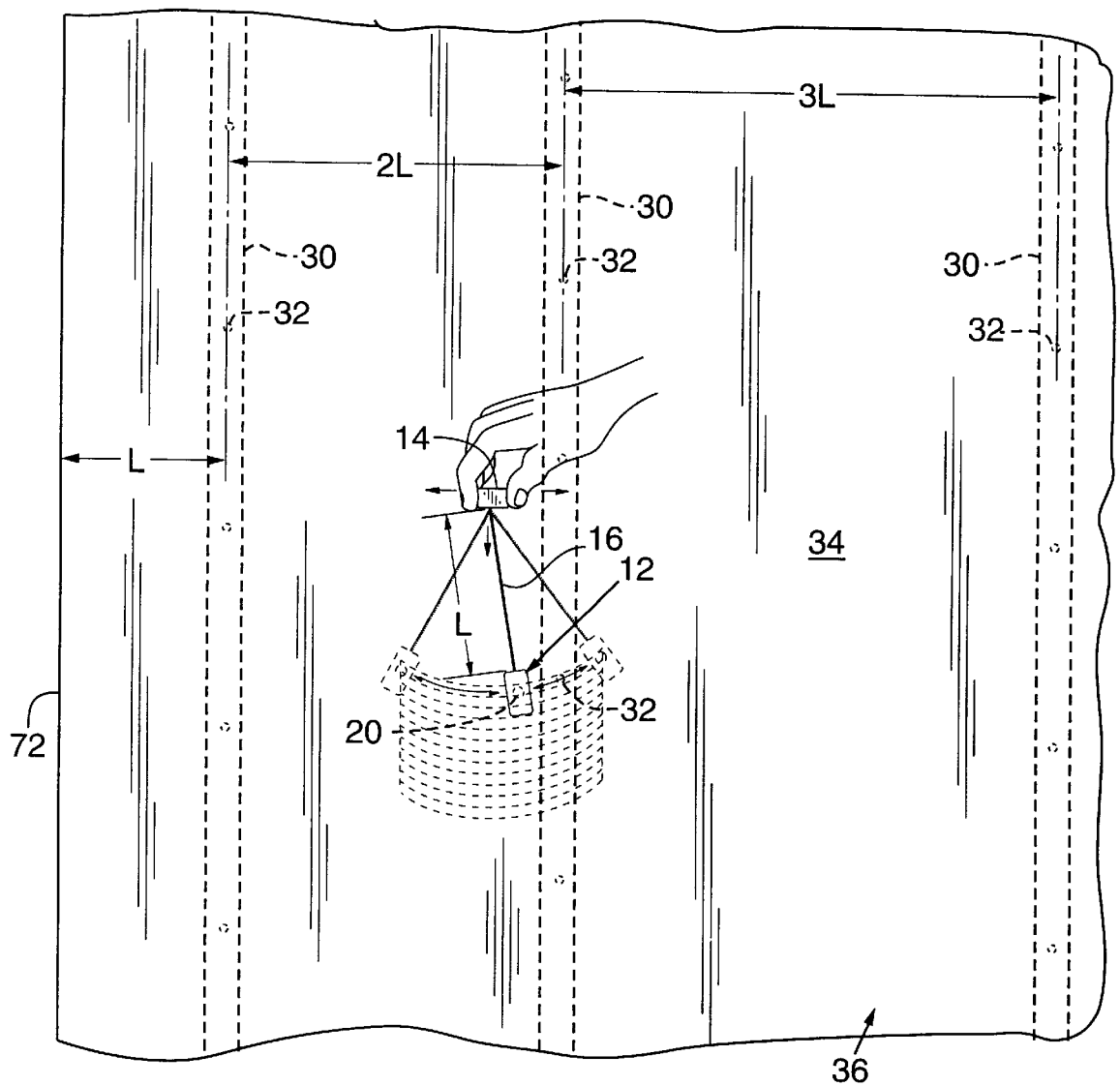
FIG. 3 is a front view showing the stud detector being moved near the surface of a wall to detect studs behind the surface of the wall.
Figure 4:
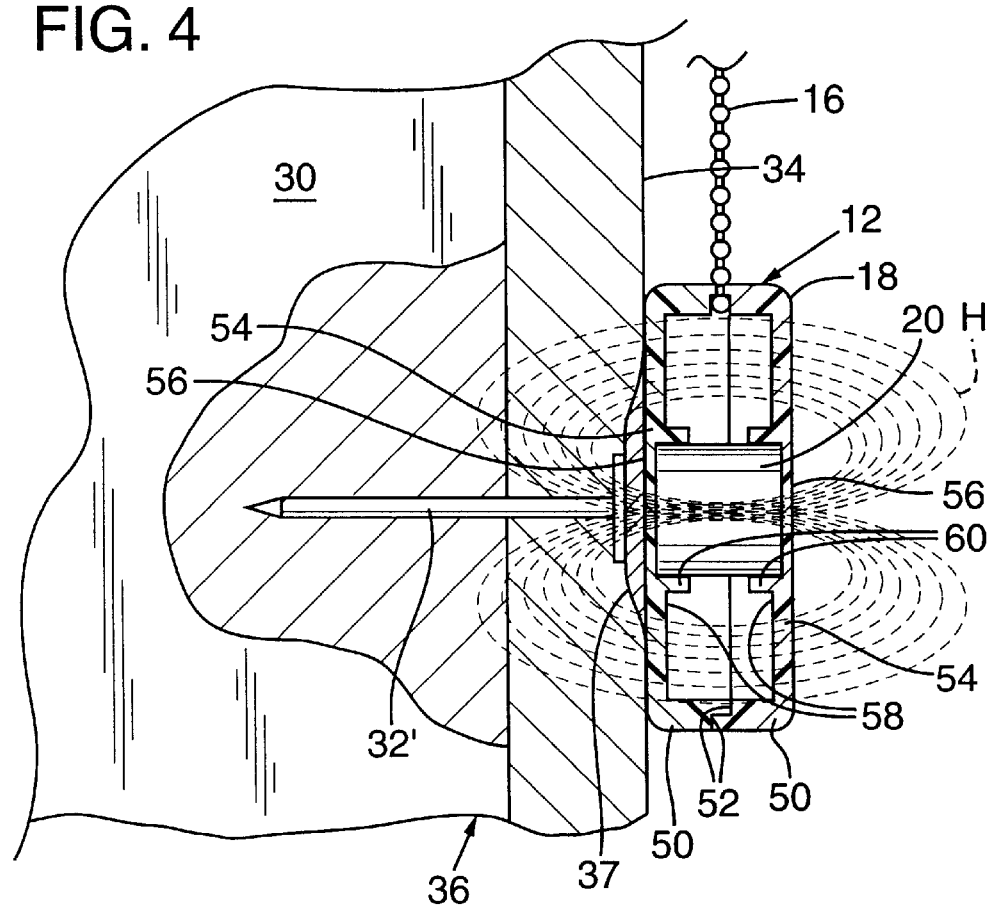
FIG. 4 is a cross-sectional view of the wall of FIG. 3, showing the stud detector detecting a nail.

As shown in FIGS. 3 and 4, stud detector 10 detects studs 30 by detecting the presence of metal objects, such as nails 32 concealed beneath a surface 34 of a wall 36. During construction of the wall, fasteners such as nails 32 are used to attach wallboard or drywall to the studs. The heads of nails 32 are covered with a finish material such as drywall putty 37 so that they are concealed behind the surface of the wall. Stud detector 10 is used to detect studs 30 by placing the sensor near wall surface 34 to cause magnet 20 to magnetically sense the presence of the nails driven into the studs.

Specifically, a person locates a stud by holding clip 14 or chain 16 near the clip and dangling sensor 12 near surface 34 of wall 36, so that one of the large flat sides of the housing faces the surface of the wall. The clip or end of the chain is then manipulated to impart a swinging, pendulum-like motion to the sensor. While the sensor is swinging, the clip is moved vertically up and down, so that the sensor passes over a generally rectangular area of the surface of the wall. If there is a nail behind the surface of the wall in the searched area, the attraction between magnet 20 and the nail will alter the swinging motion of the sensor, indicating the presence of the nail and possibly a stud to which the nail is attached. FIG. 4 shows sensor 12 and a detected nail 32'. Here, the swinging motion has been stopped altogether, and the magnetic attraction between nail 32' and magnet 20 has caused sensor 12 to stick to the wall.

As shown in FIG. 3, a number of nails 32 are spaced vertically along the length of each stud, as is typical in wood frame construction. Once a first nail is detected using the stud sensor, the presence of a stud can be confirmed by moving the sensor vertically up or down from the detected nail to search for additional nails.

Although the swinging member in the depicted embodiment is a chain, a variety of other structures can be connected to the housing, provided they can be used to swing the sensor along the surface of a wall in a search pattern to magnetically sense nails. For example, a string, cord or lightweight rod can be attached to the housing and used as the swinging member.

It should also be appreciated that the stud detector of the present invention allows studs to be located without need for visual perception on the part of a person trying to locate a stud. A person using the sensor can feel when the swinging motion of the sensor is interrupted due to the magnet being attracted to a nail or other metal object concealed behind the surface of a wall. In addition, the sensor makes a sound that can be heard by a user when the magnetic attraction causes the sensor to come into contact with a wall.

Referring again to FIG. 4, sensor 12 will be described in more detail. Housing 18 is a rectangular molded plastic enclosure, formed from two halves 50 that fit securely together by means of complementary ridges 52 provided on the rim of each half. Preferably, the halves are secured together by ultrasonic welding, though they may be glued or secured together by any other suitable means. When the two halves of the housing are fitted together, the halves pinch chain 16 between two balls of the chain to secure the housing to the chain.

Each half 50 has a flat main wall 54 with an exterior surface 56 adapted to -be placed adjacent and parallel to a wall surface when the stud detector is used to locate studs. Each main wall also has an interior surface 58 on an opposite side of the main wall from the exterior surface. A cylindrical protuberance 60 is formed on the interior surface of each half to secure magnet 20 within the housing. In the depicted embodiment, the protuberance is cylindrical to accommodate the cylindrical shape of magnet 20, though the protuberance can be appropriately modified to accommodate magnets having different shapes. When the two halves are fitted together, protuberances 60 hold magnet 20 within the housing so that the magnet does not pivot or slide within the housing.

Magnet 20 has magnetic poles 70 and is oriented within housing 18 so that, near the magnetic poles, a magnetic field H associated with the magnetic poles is generally perpendicular to exterior surfaces 56 of the housing. When the exterior surfaces are placed near and parallel to a wall surface, this orientation of the magnetic field maximizes the attraction between the magnet and nails behind the wall surface. The thickness of housing 18, as measured between exterior surfaces 56, is preferably only slightly larger than the length of magnet 20. This also maximizes attraction between the magnet and nails behind the wall surface by ensuring that the magnetic poles are as close as possible to the nails.

It should be appreciated that other types of magnets may be used with the present invention. For example, magnets having C-shaped or E-shaped cross sections may be used, as well as cylindrical cup-shaped magnets having a central post. Any type of magnet can be used, provided that it can be fixedly secured within the stud detector housing so that its magnetic field is perpendicular to the exterior surfaces of the housing near the magnetic poles of the magnet.

In addition, it should be appreciated that magnets of varying strength can be used, and that various materials may be used for the housing, swinging/measuring member and clip. Preferably, the stud detector is constructed so as to maximize the ratio of magnet strength to the overall weight of the stud detector, so that the sensor will stick to the wall when a nail or other metal object is detected.

Referring back to FIG. 3, the method of using the stud detector will be described in more detail. Chain 16 has a preselected length L that corresponds to a conventionally used stud configuration. FIG. 2 depicts three different stud configurations. One of studs 30 is spaced from edge 72 of wall 36 by a distance L. Two adjacent studs are spaced by a distance 2 L, while other adjacent studs are spaced by a distance 3 L. As shown in the figure, the length of chain 16 can be equal to, one half of, or one third of the depicted stud spacings. More generally, the chain length can be chosen to be any convenient fraction or multiple of a conventionally used stud spacing.

The preselected length of chain 16 allows the chain to be used as a measuring member to assist in locating studs. For example, assuming that the entire wall of FIG. 3 is constructed with studs spaced by a distance 3 L, once a first stud is identified using the nail-detecting method described above, the location of a second stud is easily identified. Using the first identified stud as a reference point, chain 16 is used to measure three chain lengths (3 L) along the wall surface to identify an area in which a second stud might be located. The stud detector is then used as previously described to search in the identified area for a second stud by magnetically sensing nails.

In the event that the identified area does not contain a stud, it is likely that a stud is close by, and the search area can be progressively moved to the right or left of the identified area until a stud is located. This might happen, for example, where the edge of a door or window, or the edge of a wall, is used as a reference point. These structures are sometimes not aligned with studs, and as a result, studs may be spaced at unconventional intervals from these structures.

In the embodiment depicted in FIGS. 1 and 2, chain 16 is 8" long. In wood frame construction, adjacent studs are typically spaced at either 16" or 24" intervals so that the edges of 4' by 8' sections of wallboard or drywall can be secured to the studs. Stud detector 10 works well with either spacing. Where studs are spaced by 16", two chain lengths are used to measure along the wall surface from an identified stud. Where studs are spaced by 24", three chain lengths are used.

Additionally, it should be appreciated that the described apparatus and method works equally well to locate cross bracing and other horizontal supporting structures used to construct walls.

Figure 5:
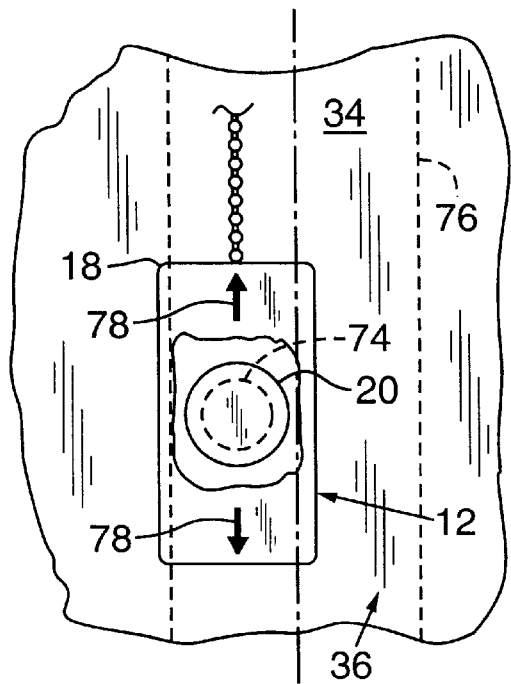
FIG. 5 is a front view of the wall of FIG. 3 showing the stud detector detecting an off-center nail.

FIG. 5 depicts stud detector 10 detecting an off-center nail 74 driven into stud 76. Housing 18 of stud detector 10 includes markings, such as center lines 78, to indicate a portion of the wall surface behind which the detected stud is located. Even where the detected nail is off-center, a portion of the stud will still be behind the area of the wall surface indicated by the center lines. The center lines assist in marking the wall to indicate the presence of the identified stud, or in driving a nail, screw or other fastener through the wall surface and into the detected stud.

Figure 6:
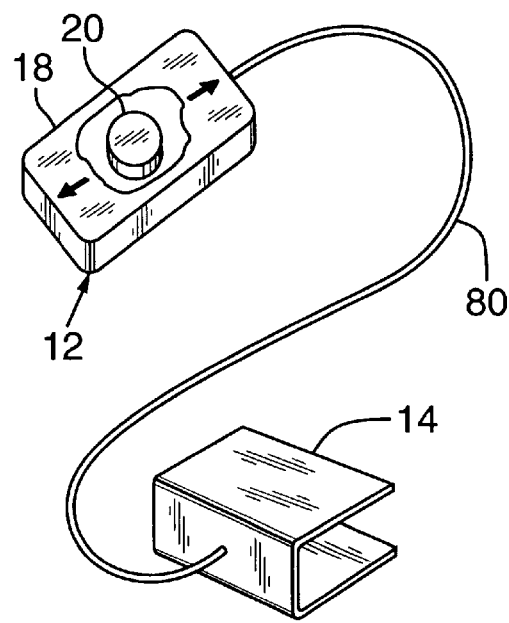
FIG. 6 is an isometric view of an alternate embodiment of a stud detector constructed according to the present invention.

FIG. 6 is an alternate embodiment of the stud detector, where the swinging/measurement member is a cord 80 instead of a chain. String or other materials may be used as well for the swinging/measurement member, provided they are flexible and substantially inelastic along their length in order to provide accurate measurements.

While the invention has been disclosed in its preferred form, the specific embodiments thereof as disclosed and illustrated herein are not to be considered in a limiting sense as numerous variations are possible. Applicant regards the subject matter of his invention to include all novel and non-obvious combinations and subcombinations of the various features, functions, elements and/or properties disclosed herein. No single feature, function, element or property of the disclosed embodiments is essential. The following claims define certain combinations and subcombinations that are regarded as novel and non-obvious. Other combinations and subcombinations of features, functions, elements and/or properties may be claimed through amendment of the present claims or presentation of new claims in this or a related application. Such claims, whether they are different, broader, narrower or equal in scope to the original claims, are also regarded as included within the subject matter of applicant's invention.

I claim:

1. A stud detector for detecting studs behind the surface of a wall, comprising:
   a sensor including a magnet fully enclosed within a housing; and
   a swinging member having first and second ends, the second end being connected to the sensor,
   wherein a person can hold the first end of the swinging member and swing the sensor like a pendulum near the surface of the wall, the magnet being operable to detect the presence of a stud behind the surface of the wall by detecting the presence of a metal object.

2. The stud detector of claim 1, wherein the swinging member has a preselected length that corresponds to a conventionally used stud configuration in which adjacent studs are spaced by eight sixteen or twenty four inches, the swinging member facilitating identification of a surface portion of the wall behind which the stud is located by measuring a preselected distance from a reference point.

3. The stud detector of claim 2, wherein the preselected length is a fraction of a conventionally used spacing between adjacent studs.

4. The stud detector of claim 2, wherein the preselected length is equal to a conventionally used spacing between adjacent studs.

5. The stud detector of claim 1, further comprising a clip connected to the first end of the swinging member, wherein the clip is sized so that the sensor can be stored within the clip when the stud detector is not in use.

6. The stud detector of claim 1, the sensor further comprising a housing, wherein the magnet is fixedly secured within the housing.

7. The stud detector of claim 1, wherein the swinging member is flexible.

8. The stud detector of claim 7, wherein the swinging member is a chain.

9. A stud detector for detecting studs behind the surface of a wall, comprising:
   a measuring member having first and second ends and a preselected length that corresponds to a conventionally used stud configuration in which adjacent studs are spaced by eight, sixteen or twenty-four inches; and
   a sensor connected to the second end of the measuring member, including a magnet fully enclosed within a housing for detecting the presence of a stud behind the surface of the wall by detecting the presence of a metal object,
   wherein the measuring member permits identification of a surface portion of the wall behind which a stud is located by measuring a preselected distance from a reference point.

10. The stud detector of claim 9, wherein the preselected length is a fraction of a conventionally used spacing between adjacent studs.

11. The stud detector of claim 9, wherein the preselected length is equal to a conventionally used spacing between adjacent studs.

12. The stud detector of claim 9, further comprising a clip connected to the first end of the measuring member, wherein the clip is sized so that the sensor can be stored within the clip when the stud detector is not in use.

13. The stud detector of claim 9, the sensor further comprising a housing, wherein the magnet is fixedly secured within the housing.

14. The stud detector of claim 9, wherein the measuring member is flexible.

15. The stud detector of claim 14, wherein the measuring member is a chain.

16. A stud detector for detecting studs behind the surface of a wall, comprising:
   a housing having an exterior surface; and
   a magnet having north and south magnetic poles and a magnetic field associated with the magnetic poles, the magnet being fixedly secured and fully enclosed within the housing so that the magnetic field near at least one of the magnetic poles is substantially perpendicular to the exterior surface of the housing,
   wherein the exterior surface of the housing is placed adjacent and parallel to a surface of a wall so that the magnet is operable to detect the presence of a stud in the wall by detecting the presence of a metal object.

17. The stud detector of claim 16, further comprising a swinging member having first and second ends, the second end being connected to the housing, wherein the swinging member is adapted so that a person can hold the first end of the swinging member and swing the housing like a pendulum near the surface of the wall.

18. The stud detector of claim 17, wherein the swinging member has a preselected length that corresponds to a conventionally used stud configuration in which adjacent studs are spaced by eight sixteen or twenty four inches, the swinging member being adapted to permit identification of a surface portion of the wall behind which a stud might be located by measuring a preselected distance from a reference point.

19. The stud detector of claim 18, wherein the preselected length is a fraction of a conventionally used spacing between adjacent studs.

20. The stud detector of claim 18, wherein the preselected length is equal to a conventionally used spacing between adjacent studs.

21. The stud detector of claim 17, wherein the swinging member is flexible.

22. The stud detector of claim 16, wherein the magnet is sufficiently strong to cause the housing and magnet to stick to a wall when the housing is placed near a nail head concealed under the surface of the wall.

23. A method of detecting studs behind a surface of a wall, comprising the steps of:
   providing a measuring member having first and second ends and a length that corresponds to a conventionally used stud configuration in which adjacent studs are spaced by eight sixteen or twenty four inches;
   providing a sensor including a magnet fully enclosed within a housing, the sensor connected to the second end of the measuring member;
   identifying an area of a wall surface behind which a stud might be located;

holding and moving the first end of the measuring member so that the magnet moves along the wall surface in the identified area to detect the presence of a stud behind the wall surface by detecting the presence of a metal object.

24. The method of claim 23, wherein the step of identifying an area of the wall in which the stud might be located is performed by using the measuring member to measure from a known reference point.

25. The method of claim 24, wherein the known reference point is an edge of the wall.

26. The method of claim 24, wherein the known reference point is an identified stud.

27. The method of claim 23, wherein the step of holding and moving the first end of the measuring member so that the magnet moves along the surface of the wall in the identified area is performed by:

moving the first end of the measuring member so that the sensor swings back and forth like a pendulum; and moving the first end of the measuring member vertically while the sensor is swinging back and forth.

28. The stud detector of claim 1, where the housing includes a rectangular plastic enclosure.

* * * * *